United States Patent [19]
Hara et al.

[11] 3,761,623
[45] Sept. 25, 1973

[54] APPARATUS FOR EXAMINING THE INNER SURFACE OF PIPES

[75] Inventors: Atsushi Hara; Yoshitaka Ohno, both of Kawasaki, Japan

[73] Assignee: Nippon Kokan Kabushiki Kaisha, Tokyo, Japan

[22] Filed: Feb. 25, 1972

[21] Appl. No.: 229,288

[30] Foreign Application Priority Data
Mar. 3, 1971  Japan.............................. 46/10786
Mar. 3, 1971  Japan.............................. 46/12990
May 7, 1971  Japan.............................. 46/36163

[52] U.S. Cl............................. 178/6.8, 178/DIG. 1
[51] Int. Cl. .............................................. H04n 7/18
[58] Field of Search................ 178/DIG. 1, DIG. 37, 178/DIG. 38, 6.8

[56] References Cited
UNITED STATES PATENTS
3,504,122  3/1970  Ratliff.......................... 178/DIG. 38
3,437,747  4/1969  Sheldon......................... 178/DIG. 1
FOREIGN PATENTS OR APPLICATIONS
1,064,100  8/1959  Germany....................... 178/DIG. 1

Primary Examiner—Howard W. Britton
Attorney—Flynn & Frishauf

[57] ABSTRACT

Apparatus for circumferentially scanning the inner surface of a pipe by means of a television camera and for displaying the image on a monitor outside of the pipe includes a rollable carriage adapted to be pushed in the pipe, means for driving the carriage axially of the pipe, a television camera conveyed by the carriage, a camera head including a window on one side thereof and rotatably mounted on the camera, a source of light contained in the camera head to illuminate the inner surface of the pipe through the window, a reflective mirror disposed in the camera head at an angle with respect to the optical axis of the lens of the television camera so as to receive the light reflected from the inner surface through the window and to reflect the light toward the lens of the camera, means to rotate the camera head about the optical axis and means for converting the photographic image into an electrical signal which is sent to the monitor.

9 Claims, 3 Drawing Figures

APPARATUS FOR EXAMINING THE INNER SURFACE OF PIPES

BACKGROUND OF THE INVENTION

This invention relates to apparatus for examining the inner surface of a pipe or tubular body.

Prior art apparatus utilized to examine the condition or absence or presence of surface irregularities or defects on the inner surface of a pipe have been the so-called direct view type wherein the inner surface is viewed in the axial direction. In other words, the inner surface is viewed obliquely. Thus for example, in the case of inspecting the inner surface wall of a straight pipe, portions of the inner wall of the pipe ranging from a point at a definite distance from a photographic camera to a point at an infinite distance are pictured as a doughnut shaped image with the result that although it is possible to examine surface irregularities or defects located relatively close to the camera it is impossible to know the details of those remote from the camera.

To obviate this difficulty, it is usual to pass the camera through the pipe to be examined by pulling the camea by means of a cord or a wire threaded through the pipe, or pushing the camera by a long rod. With the cord or wire, it takes a large amount of labor and time to thread the same whereas with the long rod, it can not pass through a bent portion of the pipe. This is especially true in case where existing pipes in the field which are burried in the ground are to be examined.

SUMMARY OF THE INVENTION

It is an object of this invention to provide a novel self propelled apparatus for examining the inner surface of a pipe which can be readily moved in one or the other direction axially through the pipe and the inner surface is scanned by a television camera so that the image of the surface is displayed on a monitor outside the pipe.

Another object of this invention is to provide a novel apparatus capable of not only examining continuously and circumferentially the inner surface of a pipe but also examining precisely a particular point by stopping the movement of the examining apparatus.

Still another object of this invention is to provide a novel apparatus for examining the inner surface of a pipe capable of determining the angular position of a surface irregularity or a surface defect on the inner surface of the pipe.

Yet another object of this invention is to provide improved apparatus for examining the inner surface of a bent pipe.

In accordance with this invention there is provided apparatus for examining the inner surface of a pipe comprising a carriage having rolling means and adpated to be inserted in the pipe, means for driving the carriage axially through the pipe, a television camera conveyed by the carriage, a camera head including a window at one side thereof and rotatably mounted on the camera, a source of light contained in the camera head to illuminate the inner surface of the pipe through the window, a reflective mirror disposed in the camera head at an angle with respect to the optical axis of the lens of the camera so as to receive the light reflected from the inner surface through the window and reflect the light toward the lens of the camera, means to rotate the camera head about the optical axis and means for converting the photographic image into an electrical signal which is sent to a monitor outside the pipe whereby the inner surface of the pipe is circumferentially scanned and displayed on the monitor. Further provided is a source of spot light coupled to the carriage and disposed to project a spot light in a definite direction toward a point on the inner surface of the pipe so as to produce an image of the spot light on the monitor which acts as a reference point for affirming the angle of rotation of the camera head.

BRIEF DESCRIPTION OF THE DRAWINGS

Throughout the drawings corresponding portions are designated by the same reference numerals.

DESCRIPTION OF THE PREFERRED EMBODIMENTS

Figure 1:
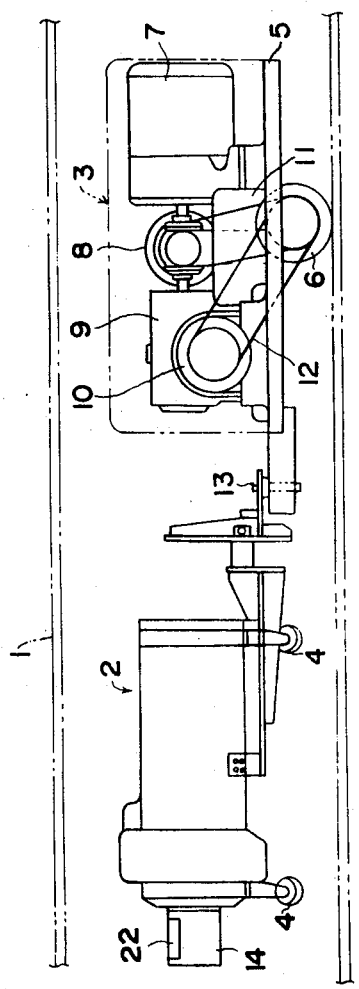
FIG. 1 is a side view of one embodiment of the invention wherein a television camera is directly coupled to a carriage.

The illustrated embodiment of this invention is used to examine the inner surface of a pipe 1 adapted to convey gas or liquid. The apparatus illustrated in FIG. 1 comprises a photographic camera 2 provided with a plurality of (four for example) wheels 4 adapted to roll along the inner surface or wall of the pipe 1 and a movable carriage 3 connected to the camera 2 through a coupling 13. A camera head 14 to be described later in detail is rotatably mounted on the fore end of the camera. The carriage 5 comprises a platform 5 supported by at least one wheel 6 and a source of drive 7 mounted on the platform 5 for driving the wheel 6. The source of drive may be a reversible electric motor connected to a low speed clutch 10 through a speed reduction gearing 9 and a high speed clutch 8. Clutches 8 and 10 are operatively connected to wheel 6 through belts or chains 11 and 12 respectively. High and low speed clutches 8 and 10 are selectively used so that when one of them is used the other is held in the inoperative condition to protect belts or chains during operation of the carriage.

Figure 2:
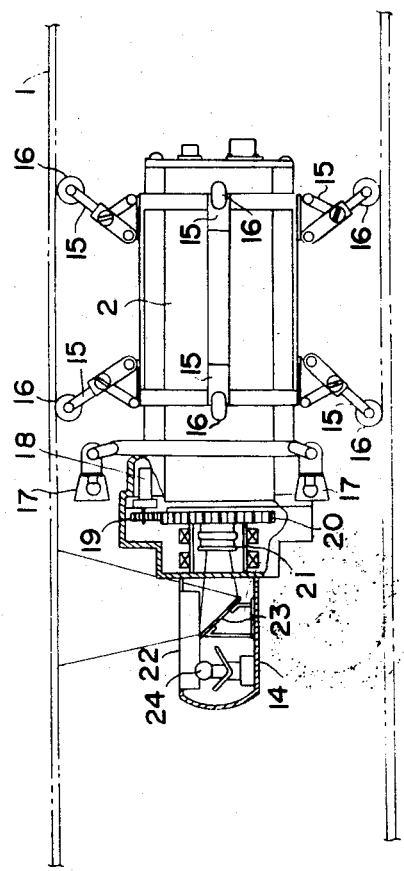
FIG. 2 shows an enlarged side view, partly in section, of another embodiment of this invention utilizing modified casters.

The details of camera 2 and camera head 14 will now be described with reference to FIGS. 2 and 3. In the embodiment shown in FIG. 2, the camera 2 takes the form of a television camera which is supported by a plurality of upper and lower casters 16 each connected to the camera through a pair of links pivotally connected at 15 so that the camera can be used for pipes of variable diameters. A plurality of lamps 17 are mounted on the camera to illuminate the portions of the inner wall of the pipe 1 in front of the camera 2. Furthermore, a small motor 18 is mounted on the fore end of the camera to drive a gear 20 through a pinion 19. Gear 20 is constructed to rotate about a lens 21 for rotating camera head 14 having a window 22 on one side thereof. On the inside of camera head 14 is contained a reflective mirror 23 inclined at a suitable angle, preferably 45° with respect to the optical axis of the lens, and a lamp 24 disposed to illuminate the inner wall of the pipe radially through window 22. The camera 2 is connected to a monitor, not shown, positioned outside of the pipe through a control cable (not shown).

In operation, motor 7 (FIG. 1) is energized to move axially through pipe 1. At the same time motor 18 is energized to rotate at a low speed the camera head 14 about the optical axis of the lens 21 through pinion 19 and gear 20. Accordingly, lamp 24 and reflective mirror 23 are rotated about the optical axis to circumferentially scan the inner surface of the pipe, thereby converting the images of successive portions of the inner wall into corresponding electric signals through lens 21 and a photoelectric transducer contained in the camera. The elctric signals are displayed on a fluorescent screen or recorded on a recording medium provided for the monitor. In this manner, irregularities or surface defects can be continuously detected. In addition, since the inner surface is illuminated in the axial as well as radial direction by lamps 17 and 24, stereographic images of the defects can be formed, thus rendering easy detection thereof.

Figure 3:
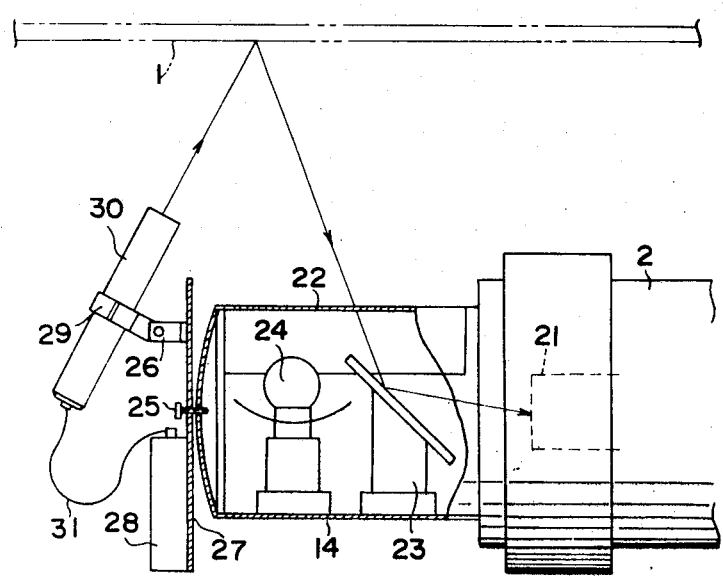
FIG. 3 is an enlarged side view, partially in section, of the camera head of the embodiment shown in FIG. 2.

FIG. 3 shows a modified camera head in which a spot light is mounted on the front end of the camera head for the purpose of correctly discriminating the position of the image displayed on the monitor. More particularly, on the front end of camera head 14 is secured a stub shaft 25 in the form of a bolt or screw to rotatably support a disc 27 carrying a battery 28 which acts also as a counter weight and a source of spot light 30 which is pivotally mounted on disc 27 by a pivot pin 26 to be set at a desired angle. The source of spot light 30 is connected to battery 28 through a conductor 31 and the spot light emanated by the source 30 is projected upon the inner wall of the pipe and is then reflected thereby back into lens 21 through reflective mirror 23.

With this construction, even if the camera head 14 is rotated, the disc 27 is held against rotation by the weight of battery 28 with the result that the source of spot light 30 is also held stationary to project a spot light toward the inner wall in a definite direction. For this reason, when the window 22 of camera head 14 is directed in the same direction as the spot light, that is when the upper inner wall is photographed, the image thereof is displayed on the monitor together with the image of the spot light whereas when the camera head is rotated to examine the other portions of the inner wall, the image of the spot light will not be displayed on the monitor. In this manner, hte image of the spot light is displayed only when the window 24 of the camera head is directed in a particular direction so that it is possible to readily determine the position of the inner wall being photographed or examined by utilizing the position of the spot light as a reference point. It is to be understood that it is possible not only to rotate the camera head 14 at a constant speed in a given direction but also to stop it at any desired position. Furthermore, as it is also possible to stop the camera and camera head at any position along the longitudinal axis of the pipe, any abnormal portion of the inner wall thereof can be examined precisely.

It should also be understood that instead of mounting the source of spot light 30 on disc 27 on the front end of the camera head it is also possible to mount the source of spot light directly on the camera 2.

It is also possible to make the brightness of the spot light larger than that of the light from lamp 24 for the purpose of providing a reference spot which can be readily discriminated. It is possible to adjust the angle of mounting of the source of spot light so that the image of the spot light will appear on the upper edge of the display screen of the monitor. The spot light may be colored, or may be oscillated to produce a flickering image thereof.

The modified embodiment shown in FIG. 3 operates as follows. After inserting camera 2 and carriage 5 into the pipe 1 (FIG. 1), driving motor 7 and clutches 8 and 10 are remotely controlled for examining the inner surface of the pipe by the camera and the monitor which is located outside the pipe. Thus, the motor 7 is opearted to drive wheel 6 at a low speed through clutch 8 and chain 11. At the same time motor 17 is operated to rotate the camera head 14. Consequently, the inner surface of the pipe is photographed while the camera is moved axially through the pipe at the low speed. The result of the examination is displayed on the monitor. Whenever an abnormal condition is observed, low speed clutch 7 is switched to drive wheel 6 at an optimum speed. Motor 7 is stopped to permit precise examination of the abnormal condition and the examining apparatus can be pulled out of the pipe by rotating the motor 7 in the opposite direction. Such reversal of the rotation can also be made when it is desired to accurately direct the camera head to the particular portion to be precisely examined.

It will be clear that the invention is by no means limited to the specific embodiments illustrated. For example camera 2 and the driving motor 7 and clutches 8 and 10 may be mounted on the same carriage. In such a case, two wheels which are disposed to contact the bottom surface of the inner wall at points above the lowest point thereof are provided so that the cable for the examining apparatus may not interfere with the movement of the carriage. It is also possible to vary the speed of the running wheel by varying the number of revolutions of the driving motor 7.

What is claimed is:

1. Apparatus for examining the inner surface of a pipe comprising:

a carriage having rolling means and adapted to be inserted in said pipe, means for driving said carriage axially through said pipe, a television camera conveyed by said carriage, a camera head including a window at one side thereof and rotatably mounted on said camera, a source of light contained in said camera head to illuminate the inner surface of said pipe through said window, a reflective mirror disposed in said camera head at an angle with respect to the optical axis of the lens of said television camera so as to receive the light reflected from the inner surface through said window and to reflect the light toward the lens of said camera, means to rotate said camera head about said optical axis, a source of spot light coupled to said carriage and disposed to project a spot light in a definite direction toward a point on the inner surface of said pipe so as to produce an image of said spot light on said monitor which acts as a reference point for affirming the angle of rotation of the camera head and means for converting the photographic image into an electrical signal which is sent to a monitor outside the pipe whereby the inner surface of said pipe is circumferentially scanned and displayed on said monitor.

2. The apparatus according to claim 1 wherein the means to rotate said camera head includes means for adjusting the speed of rotation of said camera head from the outside of said pipe.

3. The apparatus according to claim 1 which further includes a source of light for illuminating the portions of the inner surface ahead of said camera.

4. The apparatus according to claim 1 wherein said rolling means is variable in size.

5. The apparatus according to claim 1 wherein said carriage driving means includes means for moving said carriage at different speeds.

6. The apparatus according to claim 1 wherein said carriage comprises two sections coupled together, one of said sections carrying said camera and the other of said sections carrying said carriage driving means.

7. The apparatus according to claim 1 wherein said source of spot light is adjustably attached to said camera.

8. The apparatus according to claim 1 wherein said rolling means comprises a plurality of casters coupled to said carriage.

9. The apparatus according to claim 8 wherein said rolling means includes an adjustable link mechanism coupling said casters to said carriage for adjusting said apparatus to variable sized pipes.

* * * * *